(12) United States Patent
Pham et al.

(10) Patent No.: US 8,379,742 B2
(45) Date of Patent: Feb. 19, 2013

(54) ESTIMATING CHANNEL CONDITIONS IN A MIMO OFDM COMMUNICATION SYSTEM

(75) Inventors: Duong Pham, Victoria (AU); Chaitanya Rao, Victoria (AU); Thirukkumaran Sivahumaran, Victoria (AU)

(73) Assignee: NEC Corporation, Tokyo (JP)

( * ) Notice: Subject to any disclaimer, the term of this patent is extended or adjusted under 35 U.S.C. 154(b) by 293 days.

(21) Appl. No.: 12/865,544

(22) PCT Filed: Jan. 30, 2009

(86) PCT No.: PCT/JP2009/052000
§ 371 (c)(1),
(2), (4) Date: Aug. 11, 2010

(87) PCT Pub. No.: WO2009/096601
PCT Pub. Date: Aug. 6, 2009

(65) Prior Publication Data
US 2010/0329379 A1 Dec. 30, 2010

(30) Foreign Application Priority Data
Feb. 1, 2008 (AU) ................................ 2008900471

(51) Int. Cl.
*H04K 1/10* (2006.01)
*H04L 27/28* (2006.01)
(52) U.S. Cl. ......... 375/260; 375/224; 375/285; 375/296
(58) Field of Classification Search .......... 375/224–225, 375/285, 259–260, 296, 340, 346–348; 370/229–230.1, 235; 455/63.1, 501, 513
See application file for complete search history.

(56) References Cited

U.S. PATENT DOCUMENTS
6,335,954 B1 * 1/2002 Bottomley et al. ........... 375/354
(Continued)

FOREIGN PATENT DOCUMENTS
JP 2005-509316 4/2005
WO WO 2006/069300 6/2006
(Continued)

OTHER PUBLICATIONS

Xiaoqiu Wang, Satoshi Konishi, Toshinori Suzuki, Rank Prediction with consideration of Transmit Diversity for MIMO Design, IEICE Technical Report, Feb. 27, 2008, pp. 281-286.

(Continued)

*Primary Examiner* — Jean B Corrielus
(74) *Attorney, Agent, or Firm* — Young & Thompson

(57) ABSTRACT

A method of estimating channel conditions for use in a MIMO communication system includes the steps of, at a receiver: computing a SINR metric for all pre-coding matrices; computing a first capacity metric for the bandwidth from the SINR metrics, and selecting a rank which maximizes the first capacity metric; computing a second capacity metric for each frequency channel from the SINR metrics and the selected rank, and selecting one or more pre-coding matrices which maximize the second capacity metric; computing a third capacity metric from the second capacity metric, selected rank and selected pre-coding matrices for each transmission layer within each frequency channel, and selecting one or more frequency channels which maximize the third capacity metric; and transmitting the selected rank, selected pre-coding matrices and selected frequency channels to the transmitter for use in subsequent data transmissions.

14 Claims, 2 Drawing Sheets

U.S. PATENT DOCUMENTS

| | | |
|---|---|---|
| 2003/0185309 A1 | 10/2003 | Pautler et al. |
| 2006/0133521 A1 | 6/2006 | Sampath et al. |
| 2006/0285585 A1* | 12/2006 | Sampath ............... 375/227 |
| 2007/0005749 A1 | 1/2007 | Sampath |
| 2009/0067531 A1* | 3/2009 | Lee et al. .............. 375/267 |
| 2010/0027697 A1* | 2/2010 | Malladi et al. ......... 375/260 |
| 2012/0057657 A1* | 3/2012 | Khojastepour et al. ....... 375/340 |

FOREIGN PATENT DOCUMENTS

WO  WO 2006/138337  12/2006

OTHER PUBLICATIONS

International Search Report, PCT/JP2009/052000, Apr. 28, 2009.

* cited by examiner

ESTIMATING CHANNEL CONDITIONS IN A MIMO OFDM COMMUNICATION SYSTEM

TECHNICAL FIELD

The present invention relates to a communications system, and more particularly to a method and system for transmitting data in a multiple-input multiple-output (MIMO) OFDM communication system.

BACKGROUND ART

Orthogonal Frequency Divisional Multiple Access (QFDMA) is a multi-carrier modulation technique that effectively partitions overall system bandwidth into multiple orthogonal sub-bands. These sub-bands are also referred to as tones, sub-carriers, bins and frequency channels. In OFDM communication systems, each sub-band or frequency channel is associated with a respective sub-carrier that may be modulated with data.

In an OFDM communication system, an RF modulated signal from a transmitter may reach a receiver via a number of propagation paths. Characteristics of the propagation paths typically vary over time due to a number of factors such as fading and multi-paths. To provide diversity against deleterious path effects and improve performance, multiple transmit and receive antennas may be used. If the propagation paths between the transmit and receive antennas are linearly independent, that is, a transmission on one path is not formed as a linear combination of the transmissions on the other paths, in the likelihood of correctly receiving a data transmission increases as the number of antennas increase.

A MIMO communication system employs multiple transmit antennas and multiple receive antennas for data transmission. A MIMO channel formed by the transmit and receive antennas may be decomposed into multiple independent layers each of which corresponds to a different transmit/receive antenna pair. Each of the independent layers may also be referred to as a spatial sub-channel or layer. In order to increase throughput, a pre-coding matrix is applied to the layers prior to transmission.

In OFDM communication systems, feedback about the quality of the downlink channel between a transmitter and a receiver is employed in order to optimize the rate of transmission of data over the downlink channel. The receiver determines the downlink channel quality information from received pilot signals, and then communicates this downlink channel quality information to the transceiver for use in altering the pre-coding matrices, coding rate and modulation scheme of transmission used in subsequent data transmission. Whilst this downlink channel quality information is used to improve the transmission capacity of MIMO communication systems, future communication systems will require even further improvements to be made in transmission capacity due to expected increases in transmitted data volumes and increasing user expectations.

DISCLOSURE OF THE INVENTION

With this in mind, one aspect of the invention provides a method of estimating channel conditions for use in optimizing transmission capacity between a transmitter and receiver in a MIMO communications system. In such a system, data is transmitted from the transmitter to the receiver over a bandwidth partitioned into multiple frequency channels. The data is divided into multiple data streams each of which is transmitted on a different frequency channel. Each data stream is divided into multiple layers transmitted simultaneously within each frequency channel. The transmitter uses pre-coding matrices for multiplexing the multiple layers within each frequency channel. The method includes the steps of, at the receiver:

in a SINR calculation block, computing a SINR metric for all pre-coding matrices;

in a rank estimation block, computing a first capacity metric for the bandwidth from the SINR metrics, and selecting a rank which maximizes the first capacity metric;

in a pre-coding matrix estimation block, computing a second capacity metric for each frequency channel from the SINR metrics and the selected rank, and selecting one or more pre-coding matrices which maximize the second capacity metric;

in a channel quality indicator estimation block, computing a third capacity metric from the second capacity metric, selected rank and selected pre-coding matrices for each transmission layer within each frequency channel, and selecting one or more frequency channels which maximize the third capacity metric; and transmitting the selected rank, selected pre-coding matrices and selected frequency channels to the transmitter for use in subsequent data transmissions.

Advantageously, such a method enables desired rank, pre-coding matrix index and channel quality indicator information to the computed within the receiver based on maximizing transmission capacity for both the entire bandwidth and its component sub-bands or frequency channels, thus ensuring that the transmission capacity between a transmitter and receiver forming part of a MIMO communication system is successfully optimized.

The step of computing the SINR metric preferably includes computing the SINR for each sub-band from signal power estimates and noise power estimates available at the receiver.

The SINR metric may also be computed from channel estimates of the frequency channels. In order to improve the channel estimation and minimize computational complexity, the channel estimates may be sampled and/or averaged. Accordingly, a time-domain average of a plurality of channel estimates may be used to compute the SINR metric. Alternatively, or additionally, a frequency domain sampling of a plurality of channel estimates may be used to compute the SINR metric. The number of channel estimates averaged as well as the sampling rate may be varied according to the required accuracy, bandwidth, computational complexity and speed of computation required within a particular MIMO communication system.

Another aspect of the invention provides a receiver for use in a MIMO communication system in which data is transmitted from a transmitter to the receiver over a bandwidth partitioned into multiple frequency channels, the data being divided into multiple data streams each of which is transmitted on a different frequency channel, each data stream being divided into multiple layers transmitted simultaneously within each frequency channel, the transmitter using pre-coding matrices for multiplexing the multiple layers within each frequency channel, the receiver including:

an SINR calculation block for computing a SINR metric for all pre-coding matrices;

a rank estimation block for computing a first capacity metric for the bandwidth from the SINR metrics, and for selecting a rank which maximizes the first capacity metric;

a rank estimation block for computing a first capacity metric for the bandwidth from the SINR metrics, and for selecting a rank which maximizes the first capacity metric;

a pre-coding matrix estimation block for computing a second capacity metric for each frequency channel from the SINR metrics and the selected rank, and for selecting one or more pre-coding matrices which maximize the second capacity metric;

a channel quality indicator estimation block for computing a third capacity metric from the second capacity metric, selected rank and selected pre-coding matrices for each transmission layer within each frequency channel, and for selecting one or more frequency channels which maximize the third capacity metric;

wherein the receiver is configured to transmit the selected rank, selected pre-coding matrices and selected frequency channels to the transmitter to dynamically optimize transmission capacity between the transmitter and the receiver.

It will be appreciated that a reference herein to any matter which is given as prior art is not to be taken as an admission that that matter was, in Australia or elsewhere, known or that the information it contains was part of the common general knowledge as at the priority date of the claims forming part of this specification.

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

BEST MODE FOR CARRYING OUT THE INVENTION

Figure 1:
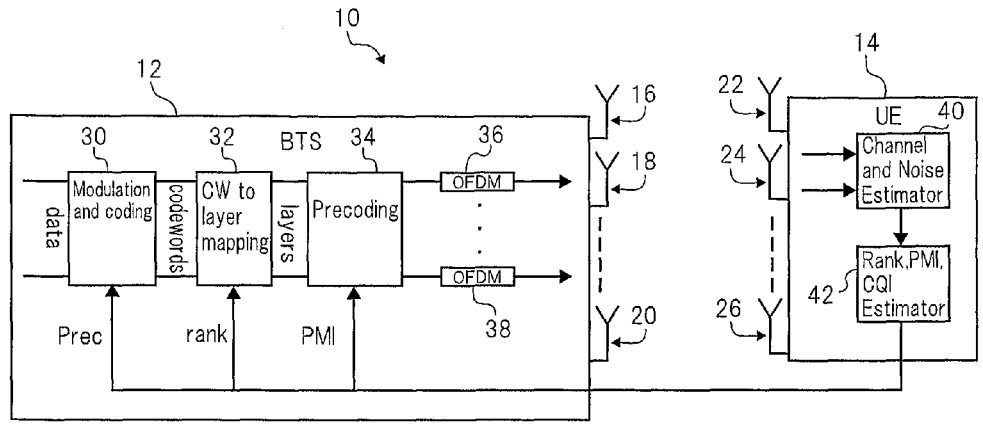
FIG. 1 is a schematic diagram of one embodiment of a MIMO communication system.

Referring now to FIG. 1, there is shown generally a MIMO communication system 10 including a transmitter 12 and receiver 14. The transmitter 12 is typically a base transceiver station (BTS), whereas the receiver 14 is a typically User Equipment (UE) adapted to receive from and transmit to the base transceiver station. The transmitter 12 includes multiple antennas 16 to 20, whereas the receiver 14 includes multiple antennas 22 to 26. It will be appreciated that a number of antennas depicted in FIG. 1 is exemplary only and that any suitable number of transmit and receive antennas may be implemented.

The transmitter 12 includes a modulation and coding block 30 for modulating and encoding data desired to be transmitted to the receiver 14. Code words generated by the modulation and coding block 30 are then mapped to data transmission layers in the mapping block 32. OFDM modulation operations are then applied to each pre-coded layer by OFDM blocks 36 to 38. The QFDM blocks 36 to 38 act to partition the overall system bandwidth into multiple orthogonal sub-bands or frequency channels. Accordingly, data is transmitted from the transmitter 12 to the receiver 14 over a bandwidth partitioned into multiple frequency channels, where that data is divided into multiple data streams each of which is transmitted on a different frequency channel.

The use of multiple transmit and receive antennas in the MIMO communication system 10 enables the transmitter 14 to encode and transmit data on a number of spatial layers independently, possibly with different rates. Each transmit and receive antenna pair creates a different radio-antenna chain through which data may be transmitted. Each of the multiple data streams is divided into multiple layers which are transmitted simultaneously within each frequency channel. The pre-coding matrices applied by the pre-coding block 34 enable increased throughput of the multiple layers by the receiver 14.

In other words, the MIMO communication system 10 divides a data stream into multiple streams, each of which is modulated and transmitted through different radio-antenna chain at the same time in the same frequency channel. Due to multipath reflections, each receive chain is a linear combination of the multiple transmitted data streams. The data streams are separated at the receiver using MIMO algorithms that rely on estimates of all channels between each transmitter and each receiver. Each multipath route can be treated as a separate channel creating multiple "virtual wires" over which to transmit signals. The MIMO communication system 10 employs multiple, spatially separated antennas to take advantage of these multiple virtual wires.

The receiver 14 includes an estimator block 40 for deriving noise power estimates, signal power estimates and channel estimates on all frequency channels between the transmitter 12 and receiver 14. The estimates derived by the estimator block 40 are used by a channel condition estimator block 42 to determine preferred pre-coding matrix index (PMI) data, rank data and channel quality indicator (CQI) data for transmission to the transmitter 12 to be used by the modulation encoding block 30, mapping block 32 and pre-coding block 34 so as to optimize transmission capacity between the transmitter 12 and receiver 14.

"Rank" is the preferred number of layers used for transmission, denoted by $r, r \leq \min\{n_T, n_R\}$, where $n_T$ is the number of transmit antennas and $n_R$ the number of receive antennas. "Pre-coding Matrix Index" (PMI) is index of the preferred pre-coding matrix in a rank r-associated subcodebook, where the transmitter premultiplies its signal by the pre-coding matrix corresponding to this index for improved transmission. The "Channel Quality Indicator" (CQI) for each of r codewords consists of the following information:

a. Coding rate, or equivalently, transport block size (TBS).

b. Modulation scheme (MS) including QPSK, 16QAM, 64QAM.

c. Preferred sub-bands for codewords to be mapped in.

Figure 2:
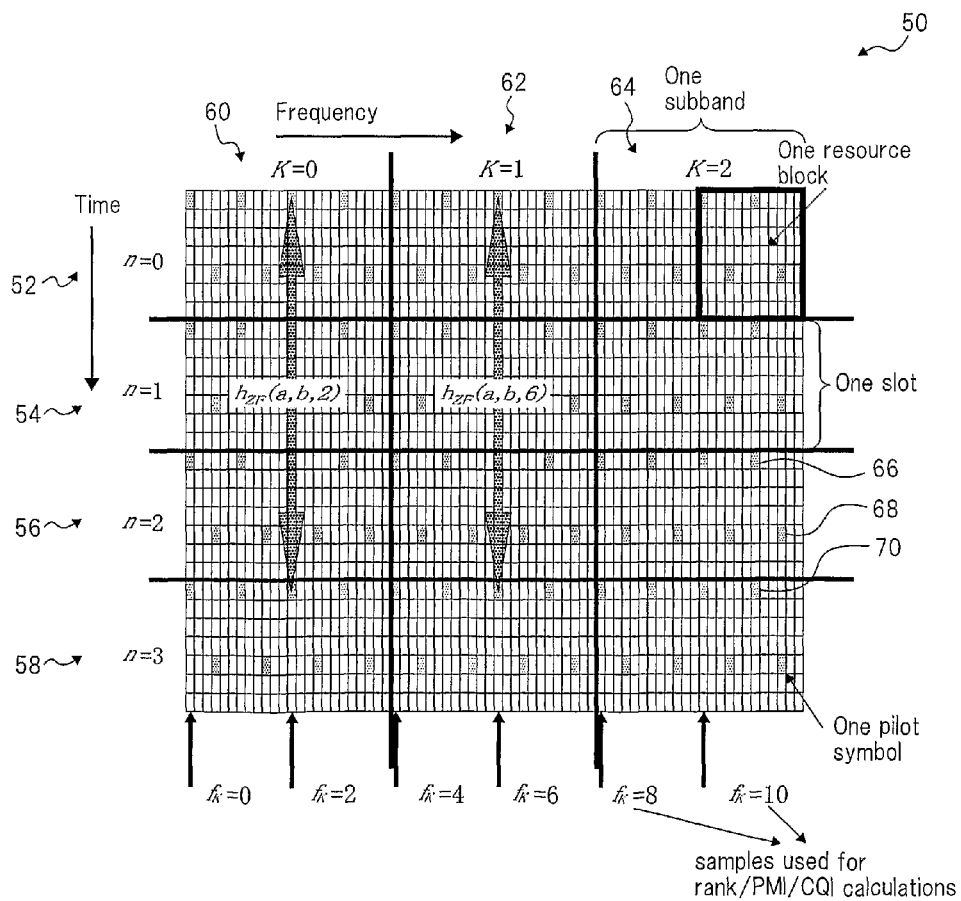
FIG. 2 is a graphical depiction of a transmission scheme used to transmit data in the MIMO communication system shown in FIG. 1.

FIG. 2 shows an example of a transmission scheme 50 used for transmitting data between the transmitter 12 and the receiver 14. The transmission scheme or "resource grid" depicts a grid of small rectangles where each rectangle is a "resource element" in which one symbol may be transmitted by each transmit antenna 16 to 20 of the transmitter 12. Transmission occurs sequentially in time and across a range of frequencies. Accordingly, the transmission scheme 50 is shown to be temporally divided into time slots 52 to 58. In addition, the bandwidth of the MIMO communication system 10 is divided into frequency channels such as those referenced 60 to 64. Multiple layers corresponding to various transmit-receiver antenna pairs are transmitted simultaneously within each of the frequency channels 60 to 64.

The shaded rectangles, such as those referenced 66 to 70, are reserved for pilot-reference symbols. Corresponding to each of these is an estimate of the channel at that particular time and particular frequency channel, for each transmit-receive antenna pair. These estimates are denoted by $h_{ZF}$.

Figure 3:
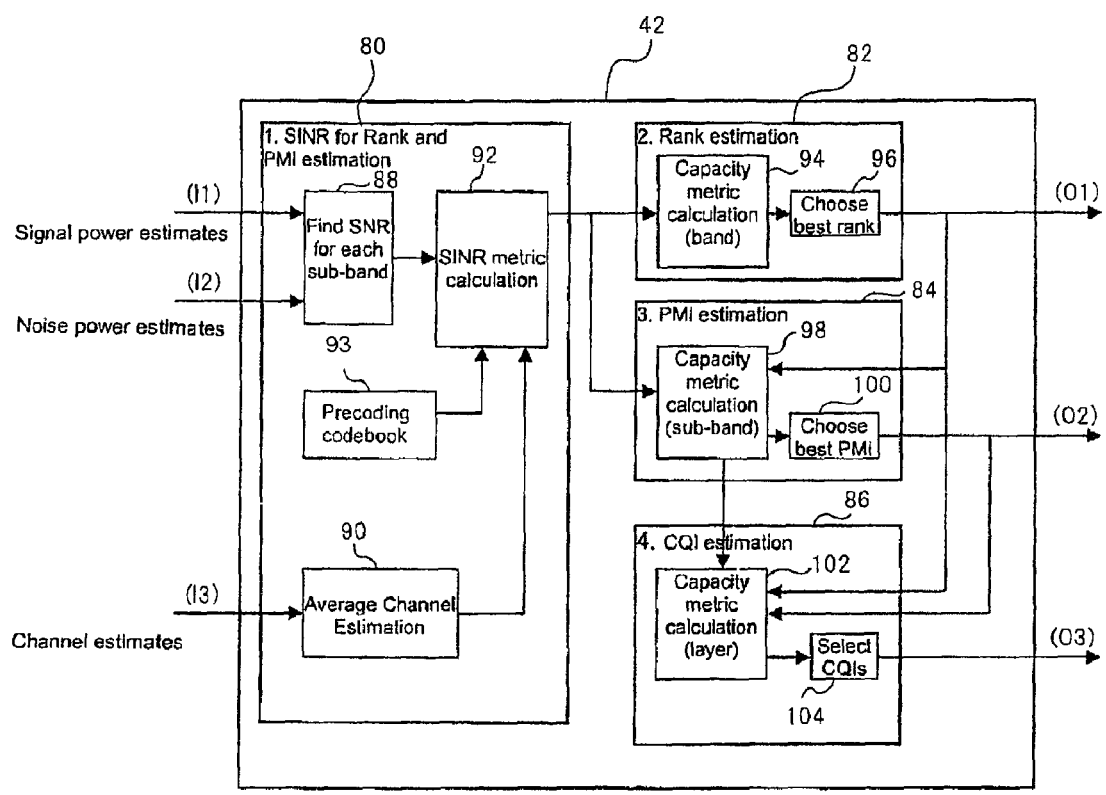
FIG. 3 is a schematic diagram of a rank, PMI and CQI estimator block forming part of a receiver of the MIMO communication system shown in FIG. 1.

As shown in FIG. 3, the channel condition estimator block 42 includes a signal-to-interference-and-noise ratio (SINR) calculation block 80, a rank estimation block 82, a pre-coding matrix estimation block 84 and channel quality indicator estimation block 86. The SINR calculation block 80 includes a signal and noise power measurement block 88 which uses received signal and noise power measurements to compute a signal-to-noise ratio (SNR) for each of the sub-bands or frequency channels shown in FIG. 2. The SNR for each sub-bank K is derived from the ratio of the total signal power (summed overall antennas) to the total noise power corresponding to a particular sub-band.

Channel estimates are received by a channel estimation block 90 within the SINR calculation block 80, and are used together with the SNR for each sub-band, by an SINR metric calculation block 92 to compute an SINR for each pre-coding matrix within a preconfigured pre-coding code book 93.

To lower computational complexity, the channel estimates at frequency $f_K$ are spaced by a tuneable parameter $N_{f_K}$, for the K-th sub-band:

$$f_K = 2KN_{RB}, 2KN_{RB} + N_{f_K},$$

$$2KN_{RB} + 2N_{f_K}, \ldots, 2KN_{RB} + \left\lfloor \frac{2N_{RB}-1}{N_{f_K}} \right\rfloor N_{f_K}$$

The transmission scheme 50 in FIG. 2 shows an example where the tunable parameter $N_{f_K}=2$, the number $N_{RB}$, of resource blocks in each sub-band equals 2 and two reference symbols are included in each resource block. ($\lfloor x \rfloor$ denotes the largest integer less than or equal to x).

To improve the estimation, the channel estimates $h_{ZF}$ are averaged in the time domain (as shown by the vertical arrows in FIG. 2). For example, the channel estimates are averaged over $N_{CQI\_H}$ samples (where $N_{CQI\_H}$ is a tunable parameter) as:

$$h_{ZF}(a, b, n, f_K) = \frac{1}{N_{CQI\_H}} \sum_{n}^{N_{CQI\_H}} \frac{h_{ZF}(a, b, n, f_K) + h_{ZF}(a, b, n+1, f_K)}{2}$$

(where $h_{ZF}(a,b,n,f_K)$ denotes the channel estimate from the b'th transmit antenna of the BTS to the a'th receive antenna of the UE at time n and frequency $f_K$). For the SINR estimation block, the scalar channel estimates $h_{ZF}(a,b,f_K)$ above are arranged into a channel matrix of size TX×RX (number of transmit by number of receive antennas).

$$H(f_K) = \begin{bmatrix} h_{ZF}(1,1,f_K) & \ldots & h_{ZF}(1,N_{tx},f_K) \\ \vdots & \ddots & \vdots \\ h_{ZF}(N_{rx},1,f_K) & \ldots & h_{ZF}(N_{rx},N_{tx},f_K) \end{bmatrix}$$

Moreover, as indicated by the arrows at the bottom of FIG. 2, the channel estimates $h_{ZF}$ can be frequency sampled, so that not all channel estimates need be used. The double headed arrows in FIG. 2 represent how multiple channel estimates can be averaged in the time domain. In this figure, 4 time slots have been spanned, representing four samples that have been averaged. The channel estimate $h_{ZF}$ (a, b, 6) refers to the resulting average of the channel estimate as the sixth frequency sample to the a'th antenna of the receiver 14 from the b'th antenna of the transmitter 12.

From the SNR calculated for each sub-band and the average channel sample estimates, the SINR metric calculation block 92 then computes an SINR for each pre-coding matrix within the preconfigured code book 93.

The SNR is computed for all possible ranks $R=R_{min}, \ldots, R_{max}$, for all PMIS associated with a rank $P_R=1, \ldots, N_R$, and for all layers within a PMI l=1, . . . , R, at a frequency $$f_K = 2KN_{RB}, 2KN_{RB} + N_{f_K},$$

$$2KN_{RB} + 2N_{f_K}, \ldots, 2KN_{RB} + \left\lfloor \frac{2N_{RB}-1}{N_{f_K}} \right\rfloor N_{f_K}$$

for the K-th sub-band according to:

$$SINR(P_R, l, f_K, K) = \frac{SNR(K)}{[SNR(K)^{-1}I_R + V_{P_R}^H H(f_K)^H H(f_K) V_{P_R}]_{ll}^{-1}} - 1.$$

In this case, $V_{P_R}$ is the precoder matrix;

$I_R$ is the R×R identity matrix;

$[\ ]_{ll}^{-1}$ denotes the (l,l)-th diagonal element of the matrix $[\ ]^{-1}$ which is inverse of the matrix $[\ ]$; and $A^H$ denotes conjugate transpose of matrix A The rank estimation block 82 then takes the SINR metrics and computes within a capacity metric calculation block 94 a capacity metric that represents the entire bandwidth of the MIMO communication system 10. The rank of pre-coding matrices that maximizes the capacity metric is then selected by a rank selection block 96.

For example, the rank $\hat{R}$ is chosen based on the capacity metric as:

$$\hat{R} = \underset{R \in [R_{min}, R_{max}]}{\arg\max} \underset{P_R \in [1, N_R]}{\max} \sum_{K=0}^{N_{RGB}-1} \sum_{f_K} \sum_{l=1}^{R} \log_2(1 + SINR(P_R, l, f, K))$$

$$= \underset{R \in [R_{min}, R_{max}]}{\arg\max} \underset{P_R \in [1, N_R]}{\max} \prod_{K=0}^{N_{RGB}-1} \prod_{f_K} \prod_{l=1}^{R} (1 + SINR(P_R, l, f_K, K))$$

The capacity metric for the entire bandwidth is defined as the sum of the capacities over each of the layers of transmission, over each of the frequencies over all $N_{RBG}$ sub-bands. The rank which maximizes this for all corresponding choices of PMI is selected as the estimated rank by the block 96.

The PMI estimation block 84 takes the SINR metrics and rank selected by the rank estimation block 82 and computes a capacity metric for each sub-band K. The index of the pre-coding matrix that maximizes this capacity metric for each sub-band is selected.

For example, the PMI $\hat{P}_{\hat{R}}$ is chosen based on the capacity metric as:

$$\hat{P}_{\hat{R}}(K) = \underset{P_{\hat{R}} \in [1, N_{\hat{R}}]}{\arg\max} \sum_{f_K} \sum_{l=1}^{\hat{R}} \log_2(1 + SINR(P_{\hat{R}}, l, f_K, K)) =$$

$$\argmax_{P_{\hat{R}} \in [1, N_{\hat{R}}]} \prod_{f_K} \prod_{l=1}^{\hat{R}} (1 + SINR(P_{\hat{R}}, l, f, K))$$

The capacity metric for a particular sub-band is calculated in a capacity metric calculation block 98, then the PMI $P_{\hat{R}}$ which maximizes this metric is selected by the block 100.

The CQI estimation block 86 takes the capacity metrics and selected ranks and PMIs from the blocks 82 and 84 and computes a capacity metric for each layer and each sub-band of transmission in a capacity metric calculation block 102.

This is converted to an estimate of the CQI and a selection block 104 acts to select the best quality sub-bands which maximize the capacity metric computed by the block 102.

By way of example, the capacity metric calculation block 102 may perform the following functions:

1. Calculate SINR for the set of sub-bands
Calculate a capacity metric $C_{ave}(l)$ for each layer across the bandwidth, $l=1, \ldots, \hat{R}$, according to:

$$C_{ave}(l) = \frac{1}{N_{RBG} \left\lfloor \frac{2N_{RB}-1}{N_{f_K}} \right\rfloor} \sum_{K=0}^{N_{RGB}-1} \sum_{f_K} \log_2(1 + SINR(\hat{P}_{\hat{R}}, l, f_K, K)).$$

Then calculate $SINR_{ave}(l), l=1, \ldots, \hat{R}$ according to:

$SINR_{ave}(l) = 2^{C_{ave}(l)} - 1.$

2. Calculate SINR for each of the K-th sub-band
Calculate a capacity metric $C(l,K)$ for each layer within a sub-band or frequency channel, $l=1, \ldots, \hat{R}$ according to:

$$C(l, k) = \frac{1}{\left\lfloor \frac{2N_{RB}-1}{N_{f_K}} \right\rfloor} \sum_{f_K} \log_2(1 + SINR(\hat{P}_{\hat{R}}(K), l, f_K, K)).$$

Calculate $SINR(l,K), l=1, \ldots, \hat{R}$ according to:

$SINR(l,K) = 2^{C(l,K)} - 1.$

3. A look-up table is then used to convert $SINR(l,K)$ into a CQI index.
To find the M best quality sub-bands, $C(K), l=1, \ldots, \hat{R}$ is calculated according to:

$$C(K) = \sum_{l=1}^{\hat{R}} C(l, K)$$

By sorting, find M sub-bands having highest mutual information, $K_{best1}, K_{best2}, \ldots, K_{bestM}$ with $C(K_{best1}) > C(K_{best2}) > \ldots > C(K_{bestM}).$ Then calculate the $SINR_{bestM}(l), l=1, \ldots, \hat{R}$ according to:

$$SINR_{bestM}(l) = \frac{1}{M} \sum_{K_{best}} SINR(l, K_{best})$$

The CQI index is an integer with small range, e.g. 1 to 32, in which case 5 bits suffice to represent this information per layer and per sub-band. The CQIs of the best M sub-bands may be represented relative to an average value e.g. if CQI_ave=10, and the CQIs of the best 3 sub-bands have CQIs 15, 14, 12, then one "efficient format" would be to encode 10 using 5 bits (01010) and then the differences 5, 4, 2 using say 3 bits each: 101, 100, 010.

It can be seen from the foregoing that the invention provides accurate information at three levels. Firstly, an optimal rank or number of layers of transmissions for use by the transmitter. Secondly, an optimal pre-coded matrix that would apply to each sub-band that the bandwidth of the MIMO communication system is divided into, and thirdly, information about the channel quality for each layer of transmission within each sub-band. Moreover, the use of multiple channel estimates enables the MIMO communication system 10 to have a higher degree of accuracy of rank and PMI selections. Flexible frequency domain sampling of channel estimates is used to ensure that a channel that is costed in frequency can use fewer samples than one that is frequency dependent. Flexible time domain-averaging is also used to improve the channel estimates in different conditions of mobile speeds. Moreover, capacity-domain averaging provides more accurate representation of theoretical total throughput that can be handled by the channel. That is, the capacity for sub-band K, layer l using $\hat{P}_{\hat{R}}(K)$ is calculated as $$\frac{\sum_{f_K} \log_2(1 + SINR(\hat{P}_{\hat{R}}(K), l, f_K, K))}{\#samples}.$$

This application is based upon and claims the benefit of priority from Australian Provisional Patent Application No. 2008900471 filed in the Australian Patent Office on Feb. 1, 2008, the contents of which are hereby incorporated by reference.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

The invention claimed is:

1. A method of estimating channel conditions for use in optimizing transmission capacity between a transmitter and receiver in a multiple-input, multiple-output (MIMO) communication system, data being transmitted from the transmitter to the receiver over a bandwidth partitioned into multiple frequency channels, the data being divided into multiple data streams each of which is transmitted on a different frequency channel, each data stream being divided into multiple layers transmitted simultaneously within each frequency channel, the transmitter using pre-coding matrices for multiplexing the multiple layers within each frequency channel, the method including the steps of, at the receiver:
    in a signal-to-interference-and-noise ratio (SINR) calculation block, computing a SINR metric for all pre-coding matrices;
    in a rank estimation block, computing a first capacity metric for the bandwidth from the SINR metrics, and selecting a rank which maximizes the first capacity metric;
    in a pre-coding matrix estimation block, computing a second capacity metric for each frequency channel from the SINR metrics and the selected rank, and selecting one or more pre-coding matrices which maximize the second capacity metric;

in a channel quality indicator estimation block, computing a third capacity metric from the second capacity metric, selected rank and selected one or more pre-coding matrices for each transmission layer within each frequency channel, and selecting one or more frequency channels which maximize the third capacity metric; and transmitting the selected rank, selected one or more pre-coding matrices and selected one or more frequency channels to the transmitter for use in subsequent data transmissions.

2. A method according to claim 1, wherein the step of computing the SINR metric includes:

computing the SINR for each sub-band from signal power estimates and noise power estimates.

3. A method according to claim 1, wherein the SINR metric is computed from channel estimates of the frequency channels.

4. A method according to claim 3 further including the step of:

using a time-domain average of a plurality of channel estimates to compute the SINR metric.

5. A method according to claim 3 further including the step of:

using a frequency-domain sampling of a plurality of channel estimates to compute the SINR metric.

6. A method according to claim 2 wherein the SINR metric is computed from channel estimates of the frequency channels.

7. A method according to claim 4 further including the step of: using a frequency-domain sampling of a plurality of channel estimates to compute the SINR metric.

8. A receiver for use in a multiple-input, multiple-output (MIMO) communication system in which data is transmitted from a transmitter to the receiver over a bandwidth partitioned into multiple frequency channels, the data being divided into multiple data streams each of which is transmitted on a different frequency channel, each data stream being divided into multiple layers transmitted simultaneously within each frequency channel, the transmitter using pre-coding matrices for multiplexing the multiple layers within each frequency channel, the receiver including:

a signal-to-interference-and-noise ratio (SINR) calculation block for computing a SINR metric for all pre-coding matrices;

a rank estimation block for computing a first capacity metric for the bandwidth from the SINR metrics, and for selecting a rank which maximizes the first capacity metric;

a pre-coding matrix estimation block for computing a second capacity metric for each frequency channel from the SINR metrics and the selected rank, and for selecting one or more pre-coding matrices which maximize the second capacity metric;

a channel quality indicator estimation block for computing a third capacity metric from the second capacity metric, selected rank and selected one or more pre-coding matrices for each transmission layer within each frequency channel, and for selecting one or more frequency channels which maximize the third capacity metric; wherein the receiver is configured to transmit the selected rank, selected one or more pre-coding matrices and selected one or more frequency channels to the transmitter to dynamically optimizing transmission capacity between the transmitter and the receiver.

9. A receiver according to claim 8, wherein the SINR calculation block computes the SINR metric by computing the SINR for each sub-band from signal power estimates and noise power estimates.

10. A receiver according to claim 8, wherein the SINR calculation block computes the SINR metric from channel estimates of the frequency channels.

11. A receiver according to claim 10, wherein the SINR calculation block uses a time-domain average of a plurality of channel estimates to compute the SINR metric.

12. A receiver according to claim 10 wherein the SINR calculation block uses a frequency-domain sampling of a plurality of channel estimates to compute the SINR metric.

13. A receiver according to claim 9, wherein the SINR calculation block computes the SINR metric from channel estimates of the frequency channels.

14. A receiver according to claim 11 wherein the SINR calculation block uses a frequency-domain sampling of a plurality of channel estimates to compute the SINR metric.

* * * * *

UNITED STATES PATENT AND TRADEMARK OFFICE
CERTIFICATE OF CORRECTION

PATENT NO.       : 8,379,742 B2                                           Page 1 of 1
APPLICATION NO. : 12/865544
DATED            : February 19, 2013
INVENTOR(S)      : Pham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this
First Day of September, 2015

Michelle K. Lee
*Director of the United States Patent and Trademark Office*